Patented May 16, 1944

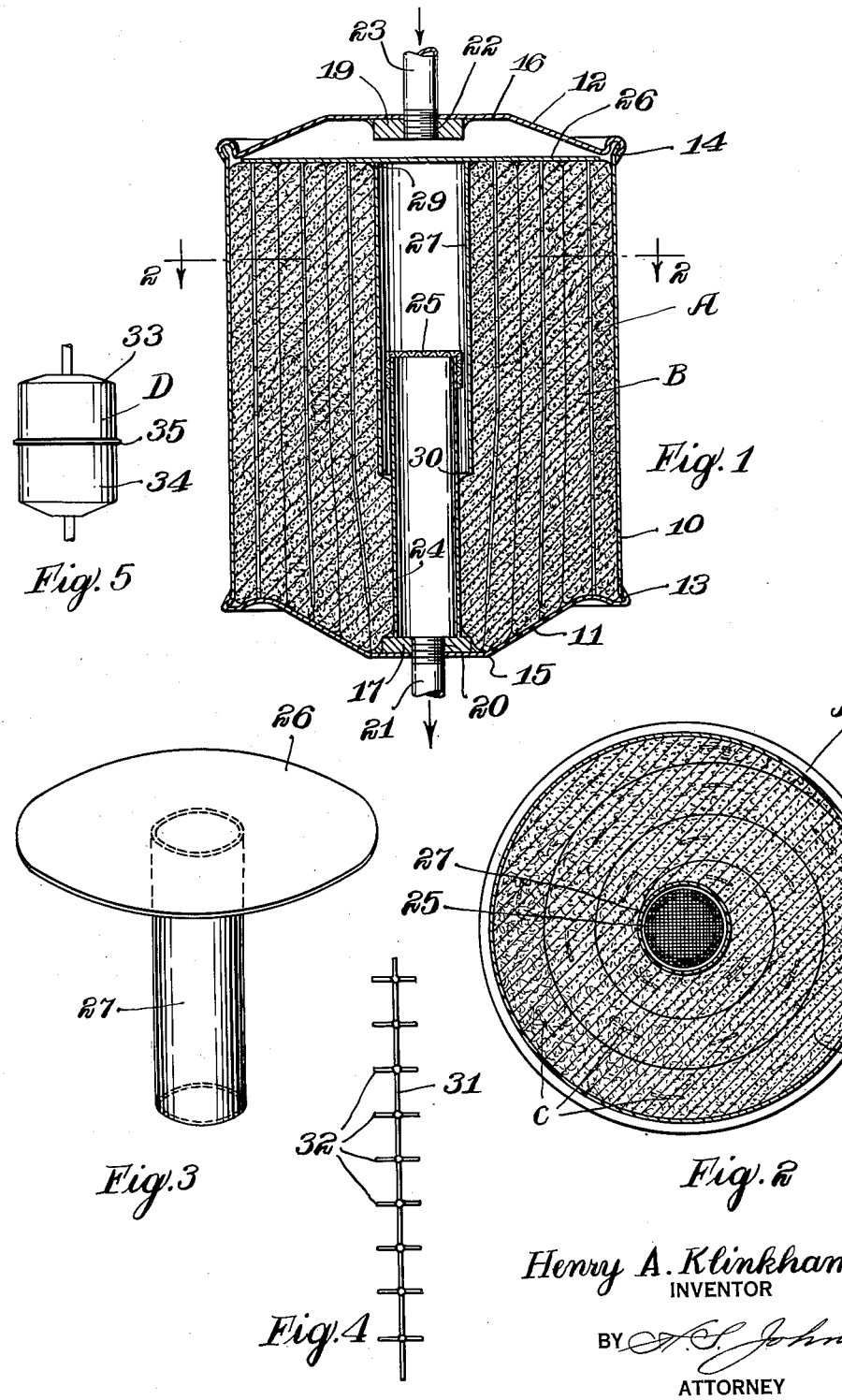

2,349,174

UNITED STATES PATENT OFFICE 2,349,174

OIL CLEANER

Henry A. Klinkhamer, St. Paul, Minn.

Application October 6, 1941, Serial No. 413,782

6 Claims. (Cl. 210—131)

My invention relates to an improvement in oil cleaners, wherein it is desired to provide a device capable of removing impurities from lubricating oil and the like.

Many types of oil filters have been previously constructed for the purpose of removing impurities from lubricating oil used in the lubrication of internal combustion engines and the like. Many of these devices have been operative, and have been useful for their prescribed purpose. Most of them, however, have been rather complicated and rather costly to manufacture. As a result, the finished devices have cost considerable sums of money.

It is the object of the present invention to provide an oil cleaner which may be constructed of a small amount of easily obtainable material at an extremely low cost. As a result, the cleaner may be produced inexpensively and may be manufactured without using material which is difficult to obtain. Most of the material from which my cleaner may be constructed may be scrap material which is readily obtainable at a low cost.

A feature of the present invention resides in the provision of a cup at the lower end of the cleaner into which the sludge and foreign material in the oil may run in the operation of the filter. This cup is designed to contain filtering material which material acts to hold the sludge and to prevent the sludge from mixing with the oil and passing through the outlet of the cleaner together with the filtering oil.

A further feature of the present invention resides in the provision of a baffle which overlies the filtering material and directs the oil entering the filter toward the outer extremity of the cleaner. The outlet of the cleaner is at the center of the cleaner body and filtering material is interposed between the outer wall of the cleaner and the outlet thereof, thus requiring that all of the oil entering the filter must pass through the filtering material.

A further feature of the present invention resides in the provision of a series of laminations of filtering material which are formed by winding an elongated strip of filtering material about the center portion of the filter. While the layers of filtering material lie closely adjacent one another there is somewhat of a tendency for heavier material, such as sludge and foreign particles within the oil to travel downwardly in these breaks between the layers of filtering material, causing these foreign particles to move toward the bottom portion of the filter.

A further feature of the present invention resides in the provision of a series of stiffening elements embodied in the layers of filtering material, which also tend to permit heavier particles to travel downwardly toward the bottom of the cleaner by gravity. These stiffening materials prevent the compacting together of the filtering material during use.

A further feature of the present invention resides in the provision of a pair of tubular members, one of which extends upwardly from the bottom wall of the cleaner casing, and the other of which extends downwardly from the baffle at the top of the cleaner casing. The depending tubular member is of larger diameter than the upwardly extending tubular member and encircles the upper portion of the upwardly extending tubular element. No oil may leave the case until it travels upwardly between the tubular elements to reach the outlet tube.

These and other objects and novel features of my invention will be more clearly and fully set forth in the following specification and claims.

In the drawing forming a part of my specification:

Figure 1 is a vertical section through the oil cleaner showing my new construction.

Figure 2 is a transverse section through the cleaner, the section being indicated on a line indicated by the numeral 2—2 of Figure 1.

Figure 3 is a perspective view of the baffle used to direct oil entering the filter.

Figure 4 is an elevation view of one of the stiffening elements embodied in the filtering medium.

Figure 5 is an elevation view of my filter showing a slightly different form of casing construction.

The oil filter A, as best illustrated in Figures 1 and 2 of the drawing, includes a cylindrical outer casing wall 10 having a bottom closure 11 and a top closure 12. The bottom closure 11 is secured marginally at 13 to the lower extremity of the cylindrical wall 10, while the upper closure 12 is secured marginally at 14 to the upper extremity of the cylindrical wall 10.

The lower wall or closure 11 is cup-shaped in formation and is provided with a depressed central portion 15. The upper closure 12 is also preferably convex in shape and is provided with a raised central portion 16. A reinforcing plate 17 is welded, soldered, or otherwise secured to the central portion 15 of the closure 11, while a plate 19 is similarly attached to the raised portion 16 of the closure 12.

An opening 20 extends through the plate 17 and the closure 11 and is internally threaded to accommodate the outlet pipe 21. The plate 19 and the closure 12 are also provided with an opening 22 therethrough which is internally threaded to accommodate the outlet pipe 21. The plate 19 and the closure 12 are also provided with an opening 22 therethrough which is internally threaded to accommodate the threads of the inlet pipe 23. The inlet pipe 23 is connected in an oil line, such as in a line from the oil pump, while the outlet pipe 21 is connected into the engine so as to drain into the crank case or any other desired location.

Extending upwardly from the plate 17, I provide a tubular element 24 which forms a continuation of the outlet pipe through the pipe 21. The tube 24 is welded, soldered, or otherwise affixed at one end to the plate 17 so that all oil leaving the cleaner must pass through the tube 24. A screen 25, or other straining element is secured as a cap over the open end of the pipe or other tubular element 24 so as to strain the oil passing therethrough. The tube 24 is substantially shorter than the casing wall 10.

A baffle 26 is designed to overlie the filtering material which will be later described, and acts to direct oil toward the casing wall 10. The baffle 26 is best illustrated in Figure 3 of the drawing and is preferably shaped similarly to the outer casing and of smaller external dimension. In the construction illustrated, the casing 10 is cylindrical in shape, and accordingly the disc 26 is circular in shape and of slightly smaller diameter than the internal diameter of the casing wall 10.

Secured to the undersurface of the baffle 26, I provide a tubular element 27 which is of slightly greater diameter than the tubular element 24. The tube 27 is secured at its upper end 29 to the undersurface of the baffle 26 by any suitable means, such as soldering, welding, or the like. The tube 27 is of sufficient length to extend into overlapping or telescoping relation with the tube 24, the lower extremity 30 of the tube 27 extending substantially below the level of the screen 25. The tube 27 is of sufficient diameter to encircle a part of the tube 24 in spaced relation thereto. Thus a considerable space is provided between the tubes 24 and 27 through which oil must flow upwardly within the tube 27 and outside of the tube 24 before the oil may pass through the screen 25 and be discharged from the cleaner.

Encircling the tubular elements 24 and 27, I provide a body of filtering material, indicated in general by the letter B. The filtering material B is preferably formed in an elongated strip which is wound about the tubular elements 24 and 27 to the diameter of the casing wall 10. The filtering material B is of sufficient width to hold the disc 26 substantially spaced from the tube 24. Thus the oil in leaving the filter must pass through several successive layers of filtering material, which while pressed closely together form vertical passages to facilitate the downward movement of heavier foreign particles in the oil. As these foreign particles have a greater tendency to move downwardly between successive layers of filtering material than the oil which carries these particles there will be a constant draining of the sludge and foreign particles toward the bottom of the filter. This settling action of the sludge and foreign materials takes place constantly and causes this material to collect at the lower end of the filter.

As the baffle 26 and tubular element 27 are supported upon the surface of the filtering material B, it is desirable to provide a means of preventing the filtering material from packing down in use. In order to accomplish this result, I provide a series of stiffening elements C which may be of a type best illustrated in Figure 4 of the drawing. These stiffening elements C, in preferred form, include a vertically extending stiffening member 31 to which is secured a series of transversely extending bars 32. The bars 32 extend transversely into the filtering material B and anchor the stiffening element C properly within the filtering material, while the vertical elements 31 tend to stiffen the filtering material and prevent the same from packing together in use.

The operation of my oil cleaner is believed obvious from the foregoing description. The oil enters through the inlet pipe 23 and is forced against the baffle 26, which spreads the oil transversely so that a thin film of oil is emitted throughout the circumference of the baffle 26. This construction is of considerable importance as it insures the spreading of the oil through the entire body of filtering material, so that all of the filtering material will be used for filtering purposes. As a result, the filtering element remains clean and operative for a longer period of time than would be the case if all of the oil had to pass through one portion of the filtering material B.

The oil flows by gravity and pressure downwardly about the outer extremity of the filtering material B, working inwardly toward the outlet at the center of the housing as it flows downwardly. Obviously the tendency for the oil flowing through the cleaner is to flow straight downwardly toward the bottom of the cleaner, and this action will continue until the cleaner fills up to the level of the discharge tube 24 when oil will begin to drain from the filter. To get from the outer extremity of the cleaner to the discharge opening, it is necessary that the oil travel through the filter as the baffle 26 is tightly clamped against one end of the filtering material B, and as this filtering material is clamped against the bottom of the filter by the weight of the baffle and by oil pressure thereupon. As the oil flow continues the upper portion of the filtering material B acts to filter the oil, while the lower portion of this material extending down into the cup-shaped depression 15 in the closure 12 acts to retain the sludge and foreign particles in the oil, keeping these particles from moving freely to one side or other of the filter due to movement of the engine. These particles constantly drain to the bottom of the filter as the oil passes through the device. The downwardly extending tube 27 prevents oil from passing in a direct route from the inlet to the outlet of the cleaner.

The filtering material B is preferably cotton, which is not packed too tightly to permit the downward flow of foreign particles. The cleaner is designed for use for a maximum length of operation, and should be changed at the end of this operation, or at least should be cleaned and the filtering material changed after the filtering material of the usual filter has become thoroughly impregnated with sludge and impurities. It is still ordinarily necessary for the oil to travel through this impregnated material in passing from the inlet to the outlet. With my construction, the resistance presented by the filtering material to the oil being filtered gradually increases as the filtering material becomes impregnated with sludge until finally the oil is allowed to by-pass just below the baffle and above the filtering material, the oil then passing over the filtering material and down along the tube 27 until it reaches the outlet opening. Accordingly, after the filtering material has become thoroughly impregnated the baffle will raise slightly to allow bypassing of the oil, thus avoiding the necessity of forcing the oil through the sludge. Thus while the oil is not filtered, at the same time it is not further contaminated through continued use of the filter after its period of usefulness has ended.

In Figure 5 of the drawing, I have disclosed a slightly different form of construction which is indicated in the drawing by the letter D. In this device the interior of the casing is identical with that of the filter A. The only difference between the filter D and the filter A is in the construction of the casing. The casing of the cleaner D is made in two sections 33 and 34 which are marginally connected together at 35. This single seam 35 takes the place of the double seams 13 and 14 and makes it possible for the casing to be made in two parts rather than in the three parts 10, 11, and 12 illustrated in Figure 1.

In accordance with the patent statutes, I have described the principles of construction and operation of my oil cleaner, and while I have endeavored to set forth the best embodiment thereof, I desire to have it understood that obvious changes may be made within the scope of the following claims without departing from the spirit of my invention.

I claim:

1. An oil cleaner comprising a casing having an inlet at the top thereof and an outlet at the bottom thereof, an imperforate tubular element projecting upwardly from the bottom of said casing in communication with said outlet to a point spaced from the casing top, a second imperforate tubular element in telescoping relation to said first tubular element and having a closed upper end, the diameters of said tubular elements being such as to space the same to provide a passage therebetween, and filter material within said casing encircling said tubular elements.

2. An oil cleaner comprising a casing having an inlet at the top thereof and an outlet at the bottom thereof, and a pair of imperforate tubular elements within said casing arranged in telescoping relation for a distance less than the length thereof, one of said imperforate tubular elements being secured to the bottom of said casing in communication with said outlet, and the other of said imperforate tubular elements having an open lower end encircling said first tubular element and outwardly spaced therefrom to provide a passage therebetween, a closed upper end on said second tubular element, and filter material encircling said telescoping tubular elements.

3. An oil cleaner comprising a casing having an inlet at the top thereof and an outlet at the bottom thereof, imperforate tubular means extending upwardly from the bottom of said casing in communication with said outlet, a baffle in said casing adjacent said inlet, and a second imperforate tubular means secured to said baffle and extending down into telescoping relation with said first tubular means for a distance less than the length thereof, the relative diameters of said tubular means being such as to provide a passage therebetween, and filtering material encircling said tubular means.

4. An oil cleaner including a casing having an inlet at the top thereof and an outlet at the bottom thereof, a tube element extending upwardly from the bottom of the casing in communication with said outlet, a baffle positioned adjacent the top of the casing to direct oil outwardly toward the casing walls, and a spirally wound filtering element extending between and contacting said baffle and the bottom of the casing and directly supported by the casing bottom.

5. An oil cleaner comprising a casing having an inlet at the top thereof and an outlet at the bottom thereof, a baffle near said inlet to direct oil outwardly toward the casing walls, an imperforate tube extending upwardly from the bottom of the casing in communication with said outlet, a second imperforate tube secured to said baffle and extending downwardly into telescoping relation with said first named tubular element for a distance substantially less than the length thereof, the diameters of said tubes being such as to provide a passage therebetween, and a spirally wound strip of filtering material encircling said telescoping tubes.

6. An oil cleaner comprising a casing having an oil inlet in the top thereof and an oil outlet at the bottom thereof, an imperforate tubular element extending upwardly from the bottom of the casing in communication with said outelt, a baffle adjacent the top of the casing to direct oil outwardly toward the casing walls, a second imperforate tubular element secured to said baffle and extending downwardly into telescoping relation with said first named tubular element for a distance substantially less than the length thereof, the diameters of said tubes being such as to provide a passage therebetween, a filter element encircling said tubular elements, and vertically extending reinforcing means in said filtering element.

HENRY A. KLINKHAMER.